(No Model.)

W. A. JORDAN.
NUT LOCK.

No. 378,008. Patented Feb. 14, 1888.

Witnesses:
J. P. Theo Lang
R. S. Fenwick

Inventor:
Wm. A. Jordan
by his attys
Mason, Fenwick & Lawrence

UNITED STATES PATENT OFFICE.

WILLIAM A. JORDAN, OF NEW ORLEANS, LOUISIANA.

NUT-LOCK.

SPECIFICATION forming part of Letters Patent No. 378,008, dated February 14, 1888.

Application filed December 2, 1887. Serial No. 256,765. (No model.)

*To all whom it may concern:*

Be it known that I, WILLIAM A. JORDAN, a citizen of the United States, residing at New Orleans, in the parish of Orleans and State of Louisiana, have invented certain new and useful Improvements in Nut-Locks; and I do hereby declare the following to be a full, clear, and exact description of the invention, such as will enable others skilled in the art to which it appertains to make and use the same.

My invention consists, first, in a nut-locking device of novel and improved construction—i. e., having a tapered form upwardly, provided with enlarged or elongated screw-bolt slots and terminated at the top in a horizontal flange; second, in the combination of the nut-locking device with the joint coupling-plate or fish-bar, bolts, and nuts of railroad-rails or other analogous devices, said nut-locking device by its tapered or wedging form, in conjunction with its horizontal flange, serving to prevent the nuts, after being screwed "home," from turning backward far enough to lift said device, and by repeatedly lifting it to finally escape it and become detached from the screw-bolts. The arrest of the nuts in their backward revolution is due to the fact that the nuts, on account of the washer having a gradually-increased thickness downwardly, become wedged against the locking device whenever they are incidentally turned backward and caused to lift the said device by its flange to an extent sufficient to produce the wedging contact between the nuts and itself, and thereby causing the backward turning of the nuts to cease; and my invention consists, third, in certain other constructions and combinations of parts, as will be hereinafter described and claimed.

Figure 1:
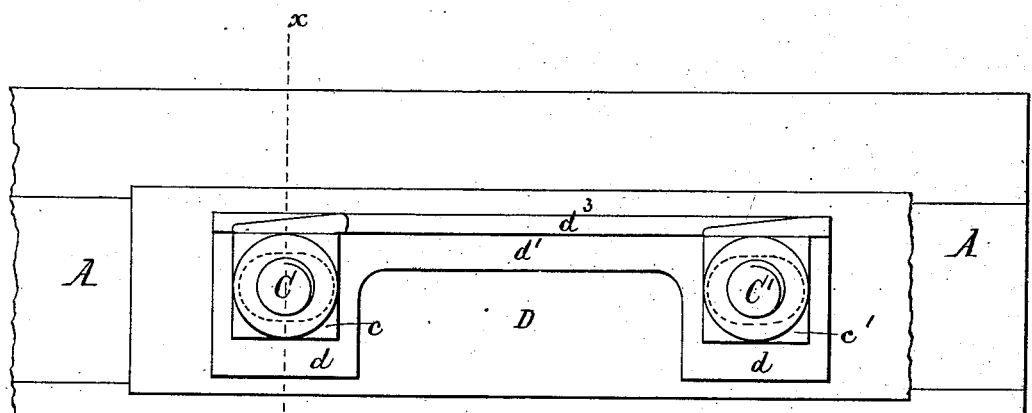
Figure 2:
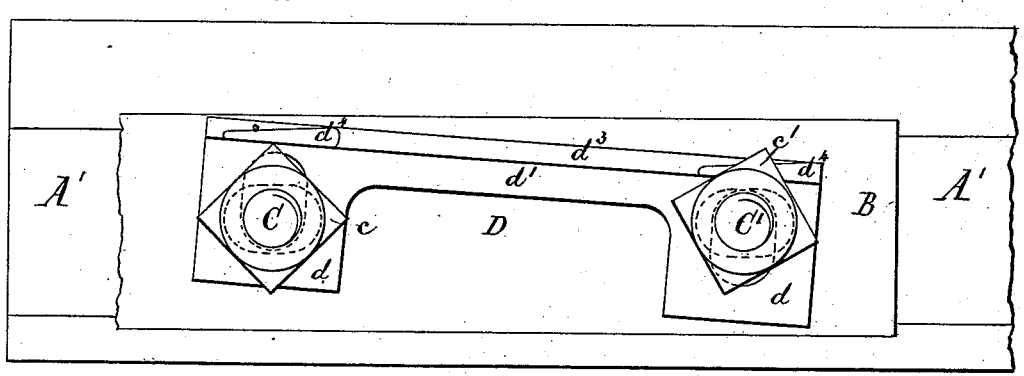
Figure 3:
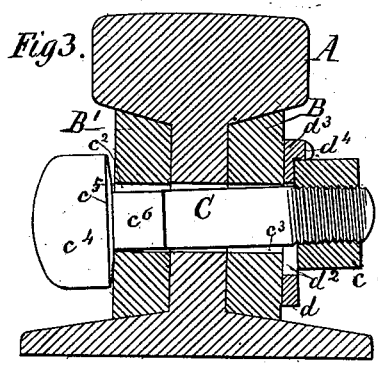
Figure 4:
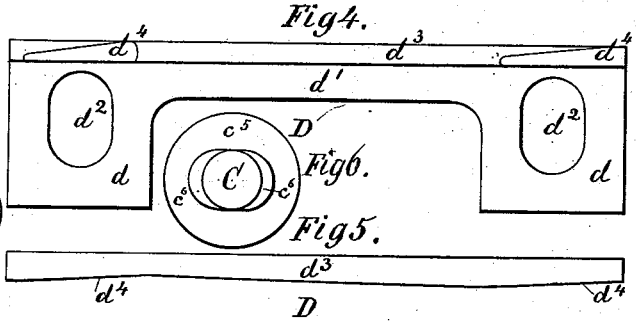
Figure 7:
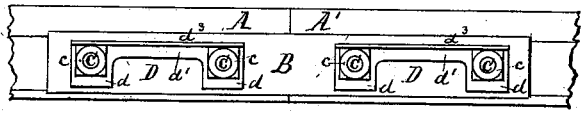

In the accompanying drawings, Figure 1 is a front elevation illustrating my nut-locking device as applied in connection with the coupling-plate or fish-bar, screw-bolts, and nuts used at the joint between the end portions of two railroad-rails. Fig. 2 is a similar view illustrating one of the inclined positions the nut-locking device is caused to assume while being adjusted to the rails being joined. Fig. 3 is a transverse section in the line $x\,x$ of Fig. 1. Fig. 4 is a front view of my locking device detached. Fig. 5 is a top view of the same. Fig. 6 is an end view of one of the screw-bolts, and Fig. 7 is a diagram showing the manner in which the invention is used for uniting railroad-rails.

The letters A A' in the drawings represent the coupled end portions of two rails; B B', fish-plates; C C', screw-bolts; $c\,c'$, nuts; and D, my nut-locking device, which in this illustration of its use serves as a double washer on each side of the rail-joint, the two nuts $c\,c'$ being screwed up against its two coupled end washer-plates, $d\,d$.

The fish-plates B B' are provided with elongated or enlarged holes $c^2\,c^3$, through which are passed the bolts C C', by which said fish-plates are fastened to the rails. Over the bolts C C' the double washer D is slipped, its two washer-plates $d$ being provided, respectively, with vertically elongated or enlarged holes $d^2$ and connected by means of a bridge-like strip, $d'$, along the top of which and the plates an angular flange, $d^3$, is provided, as shown. The washer-plates from just below the flange $d^3$ are constructed with a gradually-increased thickness down to their lower edges, thus forming wedges, as shown in Fig. 3, which render impossible such an upward motion of the washer D as will allow the nuts to turn backward a full revolution after they have been screwed home. The flange $d^3$ is provided with inclined surfaces $d^4$, the inclination of the same having the same direction and pitch as the threads on the screw-bolts C C', and by reason of said surfaces $d^4$ being provided on the flange of the washer the nuts $c\,c'$, when screwed upon said bolts, will, after coming in contact with the flange $d^3$, follow said inclined surfaces $d^4$ during the continuation of their revolution without jamming, and when the nuts are fully under the flange $d^3$ of the washer they will, by their corners, lift the washer and then allow it to drop, until finally the plates $d$ are reached, when they are turned and drawn as firmly as practicable against said plates.

The operation of adjusting the washer as just described upon the screw-bolts and fish-bar is illustrated by Fig. 2, where the nut $c'$ is shown in the act of passing over the surface $d^4$ of the flange $d^3$ of the washer and the nut $c$ in the act of lifting the washer D by the flange $d^3$. While the nuts are being screwed home, they are allowed to accommodate themselves to the taper of the plates $d$ until they stand squarely upon them by the bolts C C' assuming inclined or oblique positions corresponding with those of the nuts, and thus the nuts can be drawn on with great force without danger of breaking the bolts.

In order to facilitate the described self-adjustment of the bolts, their heads $c^4$ are provided with curved or rounded bearing-surfaces $c^5$, and the holes in the fish-plates and rails through which they are passed are sufficiently large to give them full liberty of self-adjustment. The portion $c^6$ of the bolts near their heads $c^4$ are of oval or square sectional area, in order to prevent the bolts from turning in the fish-plate B; but the holes in which they are placed are large enough to permit the screw-bolts to adjust themselves, as just described. After the nuts $c\ c'$ are screwed home, the washer D will stand at its greatest elevation, and it is therefore tapped down by the aid of a wrench or hammer until the flange $d^3$ rests upon the nuts $c\ c'$, as shown in Figs. 1 and 3, so as to be raised by the corners of the nuts when the nuts turn backward.

It will be seen that, owing to the downwardly-increasing thickness of the washer-plates $d$, it is an easy matter to lower the washer D even after it has been firmly forced against the fish-bar by the nuts $c\ c'$, and that it is almost impossible on account of the wedging form of the washer to move it high enough from its lowered position to an elevation which will allow the corners of the nuts to pass the flange $d^3$, and therefore it is evident that the jolts of railroad-trains passing over rails coupled by my device can only at most have the effect of turning the nuts $c c'$ partly around and of simultaneously therewith causing a resistance of the washer D, for when the nuts begin to turn backward they lift the washer by the flange $d^3$ and bring the thicker wedging portion of the same in jamming contact with themselves, thereby stopping further turning back of the nuts.

It will be understood that the nuts are not dependent only upon the wedge shape of the washer-plates to stop them from turning back, since the weight of the washer-plates themselves, no matter how light they may be, will, with the constant jars of cars over the rails, always cause them to rest with their flanges on the nuts, and so prevent the corners of the same from rising or the nuts turning back.

What I claim as my invention is—

1. The nut-locking device D, having a flange, $d^3$, and elongated or enlarged bolt-holes $d^2$, and connected plates $d$ with downwardly-increasing thickness, substantially as and for the purpose described.

2. The locking device D, having connected wedge-shaped plates $d$, constructed with enlarged or elongated holes $d^2$, flange $d^3$, and inclined surfaces $d^4$, substantially as and for the purpose described.

3. The nut-locking device D, having a flange, $d^3$, elongated or enlarged bolt-holes $d^2$, and sliding connected washer-plates $d$, substantially as and for the purpose described.

In testimony whereof I affix my signature in presence of two witnesses.

WILLIAM A. JORDAN.

Witnesses:
CHAS. M. HERO,
ANDREW HERO, Jr.